July 15, 1924.

J. H. SAGER

BUMPER FOR VEHICLES

Filed Nov. 20, 1923

1,501,191

INVENTOR.
James H. Sager
BY
HIS ATTORNEYS.

Patented July 15, 1924.

1,501,191

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER FOR VEHICLES.

Application filed November 20, 1923. Serial No. 675,924.

*To all whom it may concern:*

Be it known that I, JAMES H. SAGER, a citizen of the United States, and resident of Rochester, in the county of Monroe and State of New York, have invented certain new and useful Improvements in Bumpers for Vehicles, of which the following is a specification.

The present invention relates to bumpers for vehicles and an object thereof is to provide an improved means of supporting an impact member. Another object of the invention is to provide a supporting means embodying two arms formed from a single piece of material bent between its ends to provide the arms, one of said arms extending in the general direction parallel with the longitudinal frame bar of the vehicle and being secured at two points along the arm, and the other arm extending outwardly with reference to the first mentioned arm. A further object of the invention is to provide an improved supporting strap for the supporting arm of a bumper.

To these and other ends, the invention consists of certain parts and combinations of parts, all of which will be hereinafter described; the novel features being pointed out in the appended claims.

Figure 1:
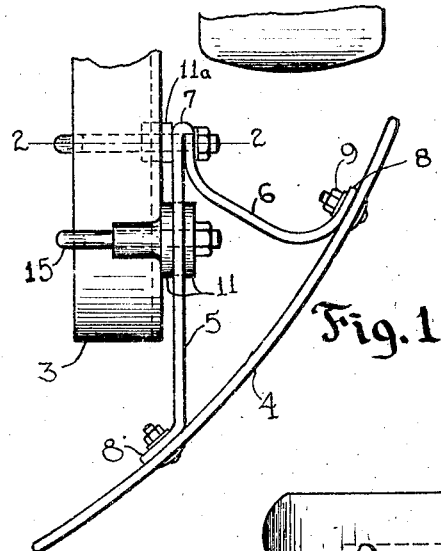
Fig. 1 is a plan view of the bumper designed for protecting the rear fender of a motor vehicle.

Referring more particularly to the drawings, 1 indicates the vehicle, 2 the rear fenders thereof, and 3 the longitudinally extending side bars which have downwardly curved rear ends and are formed of channel stock. In the illustrated embodiment of the invention two short impact members 4 are provided, each formed of two strips of flat resilient stock arranged in parallel relation.

Each impact member is supported by a supporting means embodying, in this instance, two arms 5 and 6 formed preferably from a single strip of material bent at 7 between its ends and having its end deflected outwardly at 8 and secured by bolts 9 to the impact member 4. The arm 5 extends in a general direction parallel with the side bar 3, while the arm 6 extends outwardly with reference to the arm 5 of the side bar.

Figure 2:
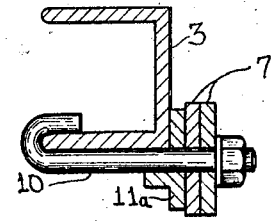
Fig. 2 is a section on the line 2—2, Fig. 1.
Figure 3:
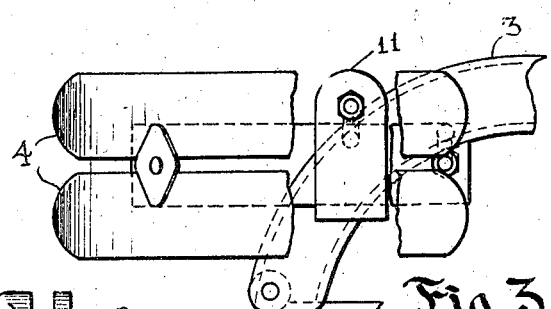
Fig. 3 is a side view of the bumper shown in Fig. 1.
Figures 4, 5:
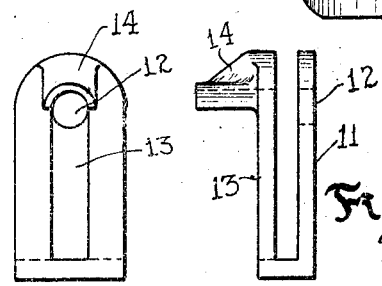
Figs. 4 and 5 are detail side views at right angles to each other of the anchoring strap.
Figure 6:
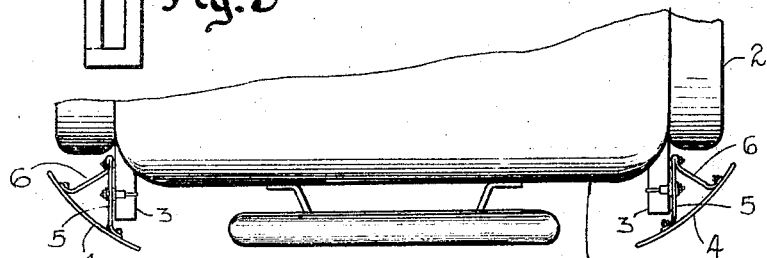
Fig. 6 is a fragmentary plan view of a motor vehicle showing two of the bumpers arranged at the rear end of the vehicle to protect the rear fenders.

To provide for the anchoring of the supporting means, the two arms are provided near the bend 7 each with an opening aligned with the opening in the other end having a J-shaped anchoring bolt 10 passing therethrough and also through a washer 11', the J bolt being anchored upon the lower flange of the side bar, as illustrated in Fig. 2. The arm 5 is held by a U shaped strap 11 which is formed in one arm with a bolt opening 12 and in the other arm with an elongated shaped slot or opening 13, this latter arm also having on its outer face a grooved lug 14 at the upper end of the opening 13. A J shaped bolt 15 passes through the openings 12 and 13 and abuts the grooved lug 14, this J bolt passing over and about the edge of the upper flange of the channel side bar 3. The arm 5 lies in the strap below the bolt so that it is unnecessary to perforate the arm 5 for securing the arm at this point, while at the same time the strap may be adjusted to different positions on the supporting arm and held or clamped in its adjusted position by the J shaped bolt. The opening 13 is elongated so that it may fit over rivets or other projections formed on the outer face of the channel bar 3.

While the invention has been described particularly for a short impact member designed to act as a guard for a rear fender of an automobile, it is apparent that some features of the invention are capable of use in bumpers extending across the front or rear of the vehicle.

What I claim as my invention and desire to secure by Letters Patent is:

1. In combination with a side bar having a downwardly curved end, an impact member, and supporting means for the impact member embodying an arm lying on one side of the side bar and two bolts for securing the supporting arm to the side bar, one of said bolts being farther from the end of the side bar than the other, a U shaped strap receiving the supporting arm between the arms of such strap and having openings in its arms above the supporting arm through which the other bolt passes, one of the arms of the strap being provided with a grooved lug above the opening extending over the side bar to cooperate with the upper side of the bolt.

2. The combination with a side bar, a rear fender situated to one side of the side bar, of a guard for the rear fender embodying an impact member and supporting means for the impact member comprising two supporting arms, one of which extends rearwardly generally in a direction parallel with the outer side of said side bar and the other of which extends outwardly with reference to the side bar, and two bolts for securing said supporting means to the side bar, one in advance of the other, the bolt farthest removed from the rear end of the side bar passing through both arms.

3. A supporting means for a bumper comprising a supporting arm, a U shaped strap for receiving the supporting arm between the arms of the strap and having an opening in one side and an elongated opening in the other side, a grooved lug extending outwardly from the strap above said elongated opening, and an anchoring bolt passed through the openings in the two arms and supported by said grooved lug.

4. In combination with a side bar of a motor vehicle, an impact member, two supporting arms for the impact member, one of which extends generally in a direction parallel with the side bar, two bolts for securing said last mentioned supporting arm to the side bar, one of said bolts being nearer to the inner end of said supporting arm, and also securing the other supporting arm, the latter extending outwardly at a point between the two bolts.

5. In a bumper, an impact member and two supporting arms for the impact member formed from a single piece of flat stock bent between its ends to provide the two arms, one of which extends outwardly with reference to the other, an anchoring device passing through both arms in proximity to to the bend, and an anchoring device for securing one of the arms at a point in spaced relation to the point where the other arm proceeds outwardly from the first mentioned arm.

6. In a bumper, an impact member and two supporting arms for the impact member formed from a single piece of flat stock bent between its ends to provide the two arms, one of which extends outwardly with reference to the other, an anchoring device passing through both arms in proximity to the bend, and an anchoring device for securing one of the arms at a point in spaced relation to the point where the other arm proceeds outwardly from the first mentioned arm, said last mentioned anchoring device being adjustable on the first mentioned arm.

7. In a bumper, an impact member, a supporting arm therefor, two anchoring devices, one arranged at the inner end of said supporting arm and the other being in the form of a strap adjustable on the supporting arm, and a second supporting arm secured by the first named anchoring device and extending outwardly with reference to the first mentioned arm free from the strap.

JAMES H. SAGER.